United States Patent
Ong (10) Patent No.: US 6,246,391 B1
(45) Date of Patent: Jun. 12, 2001

(54) THREE-DIMENSIONAL TACTILE FEEDBACK COMPUTER INPUT DEVICE

(75) Inventor: Ping-Wen Ong, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/201,947

(22) Filed: Dec. 1, 1998

(51) Int. Cl.⁷ .................................................. G09G 5/08
(52) U.S. Cl. ........................ 345/156; 345/157; 345/175
(58) Field of Search ................................. 345/156, 161, 345/157, 175; 341/2, 20; 700/85; 348/790

(56) References Cited

U.S. PATENT DOCUMENTS

| | | | |
|---|---|---|---|
| 4,536,746 | * 8/1985 | Gobeli | 341/20 |
| 4,782,327 | * 11/1988 | Kley et al. | 341/2 |
| 4,879,556 | * 11/1989 | Duimel | 341/20 |
| 5,128,671 | * 7/1992 | Thomas, Jr. | 341/20 |
| 5,286,024 | * 2/1994 | Winblad | 273/148 |
| 5,589,828 | * 12/1996 | Armstrong | 341/20 |
| 5,589,854 | 12/1996 | Tsai . | |
| 5,591,924 | 1/1997 | Hilton . | |
| 5,694,153 | 12/1997 | Aoyagi et al. . | |
| 5,786,997 | * 7/1998 | Hoyt et al. | 700/85 |
| 5,854,622 | * 12/1998 | Brannon | 345/161 |
| 5,896,164 | * 4/1999 | Orbach et al. | 348/2 |
| 5,929,846 | * 7/1999 | Rosenberg et al. | 345/161 |

* cited by examiner

*Primary Examiner*—Steven Saras
*Assistant Examiner*—Fritz Alphonse (57) ABSTRACT

A three-dimensional computer input device includes at least three elastic members which elastically support a movable object in a frame. A two-dimensional position detector is connected to one end of each of the elastic members. As the movable object is moved and/or rotated relative to the frame, the detectors collectively detect the motion and transmit the current position and/or rotational information to a computer which graphically displays the motion on a screen of the computer.

36 Claims, 7 Drawing Sheets

THREE-DIMENSIONAL TACTILE FEEDBACK COMPUTER INPUT DEVICE

BACKGROUND OF THE INVENTION

1. Field of the Invention

The present invention relates to a three dimensional computer input device having six degrees of freedom and exhibiting force feedback in response to user-initiated motion of the input device.

2. Description of the Related Art

The ability to depict a cursor in three dimensional space on a computer screen necessitates the ability to move the cursor throughout the three-dimensional space using a user controlled computer input device. Another useful characteristic for a computer input device is to provide tactile feedback to the user in response to user-initiated motion.

The computer mouse is the most widely used device for selectively moving a cursor on a computer display screen. Other common input devices are the track ball and touch screen. However, all of these input devices are restricted to 2 dimensional motion.

In U.S. Pat. No. 5,591,924, the disclosed space ball has the ability to detect three dimensionally applied forces and torques. This device does not, however, provide tactile feedback to the user.

Joysticks are also commonly used as input devices. U.S. Pat. No. 5,589,828 discloses a joystick that is movable at its base in three dimensions and provides feedback in the form of springs. Detectors at the base detect the three dimensional motion of the base. A ball that is graspable by the user is movably connected to the top of the joystick such that it rotates about all three coordinate axes. The ball includes detectors for detecting rotation of the ball. This device thus detects six degrees of motion. It is, however, complex to build, at least in part because for each degree of freedom, two one-dimensional detectors are used—one for positive motion and one for negative motion. Twelve separate detectors, six at the base of the joystick and six at the ball of the joystick, are therefore required to realize the full functionality of this prior art device.

SUMMARY OF THE INVENTION

The three-dimensional (3D) computer input device of the present invention includes a ball, a frame, and at least three spring elements connecting the ball to the frame. Each spring element is connected to a two-dimensional (2D) position sensor positioned at the connection of the spring with either the ball or the frame. The springs are preferably all connected and extend along a common plane. The frame may be constructed as a square or rectangularly-shaped housing lying in this plane and peripherally surrounding the ball with the ball positioned at a center of the square. In this manner, the frame can define a reference. In use, the user grasps the ball and pushes it forward or pulls it backward, or rotatably turns or twists the ball to variably control cursor movement or otherwise indicate intended motion.

The 2D position sensors may employ, for example, a pressure sensor design, a 2D design having a roller ball with electronically sensed movement in the x and y directions, or a gimbal design. Input buttons generally corresponding to those such as are found on a mouse may be located directly on the ball, or at another location on the frame, or otherwise remote from the ball.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
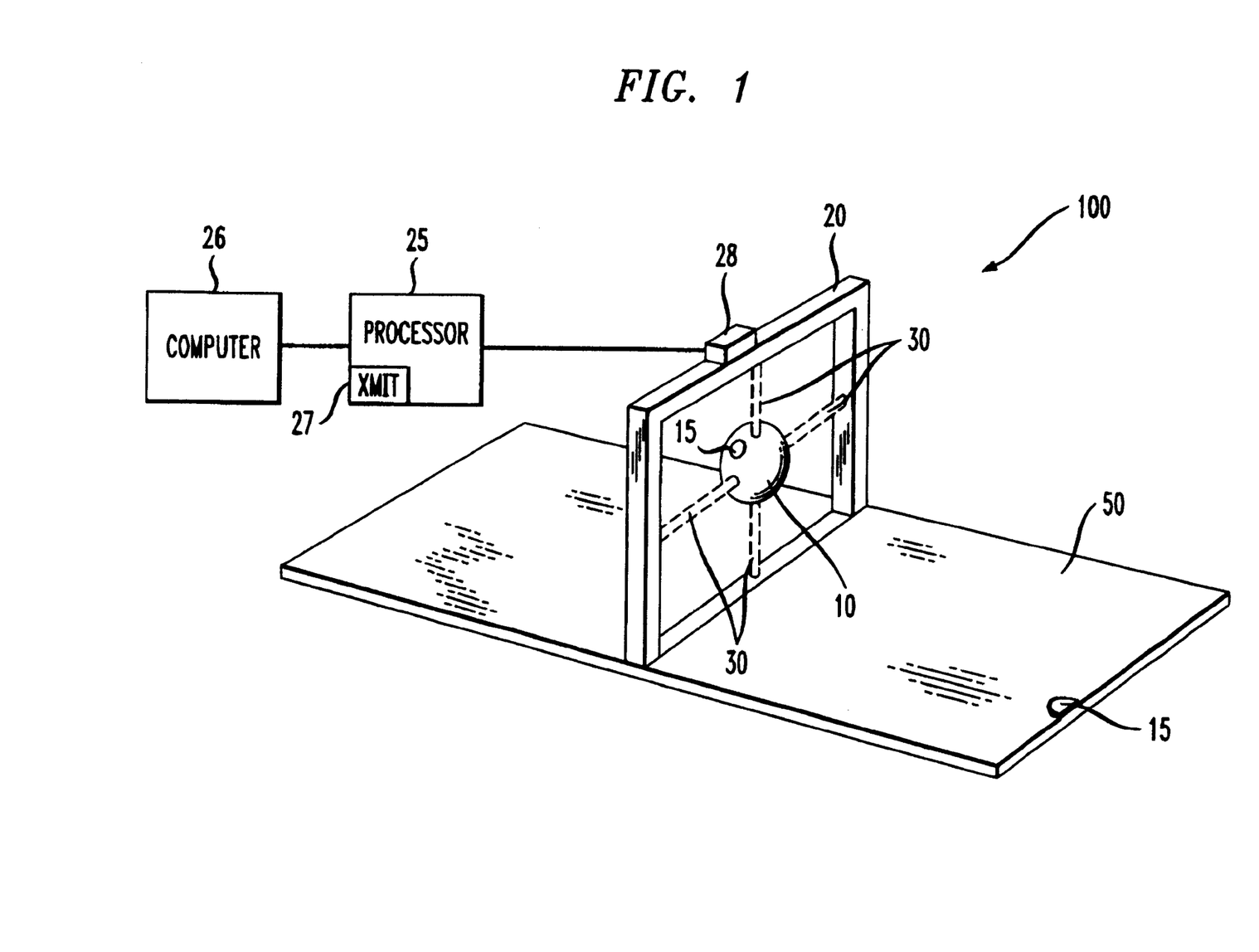
FIG. 1 is a perspective view of a preferred embodiment of a computer input device in accordance with the invention.
Figure 3A:
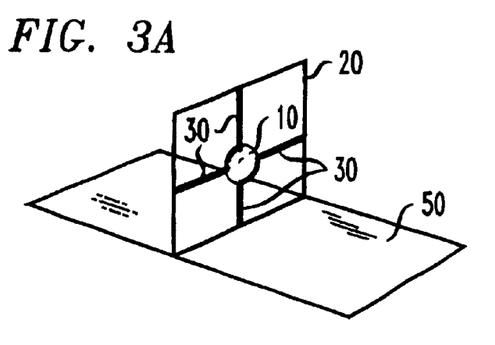
FIGS. 3a–3d are diagrammatic perspective views of the computer input device of FIG. 1 showing various positions of the movable ball relative to the frame.

Referring initially to FIG. 1, a computer input ball assembly 100, in accordance with the invention, includes a ball 10 connected to a frame 20 by at least three but preferably four springs 30. The frame 20 is mounted on a base 50. Each spring 30 has a detector 40 (not shown in FIG. 1) connected to one end of the spring 30—either between the ball 10 and the spring 30 or between the spring 30 and the frame 20—for outputting a two dimensional input signal when the ball 10 is moved from its rest position (FIG. 3a). In the preferred embodiment, the detectors are enclosed or located within the frame 20.

Also shown in the embodiment of FIG. 1 is a button 15 located, in this embodiment, on the ball 10. Button 15 functions in the manner of the input buttons present on a conventional computer mouse, and may be arranged at any ergonomically advantageous location on the ball 10. The ball may also carry more than one input button 15.

The signals generated by the detectors 40 and button(s) 15 are transmitted by a first transmitter 28 on the frame 20 to a processor 25 that receives the signals from each detector and uses those signals to determine the three-dimensional position of the ball 10 relative to the rest position of the ball 10. The first transmitter 28 may in its most basic form comprise a wired connection to a processor 25, or may be implemented as a wireless transmitter. The first transmitter 28 may alternately be located on or within the ball 10 in embodiments in which the detectors 40 are carried by or located on the ball 10.

The processor 25 includes a second transmitter 27 for transmitting the calculated three dimensional position to a computer 26. The second transmitter 27 may similarly be a simple wired connection or a signal cable or a wireless transmitter. Furthermore, the processor 25 may, for example, be an integral part of the computer input ball assembly 100 or a part of the computer 26.

Figure 2A:
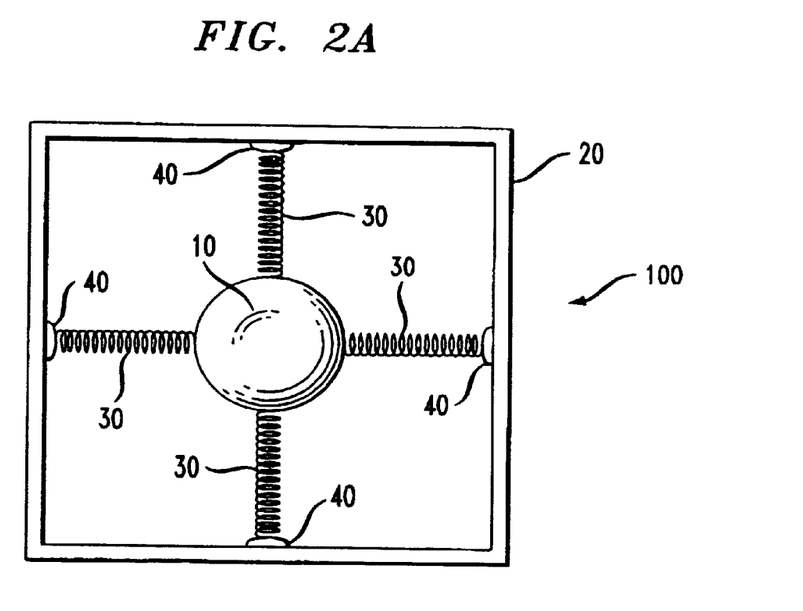
FIGS. 2a and 2b show alternate arrangements for elastically connecting a ball-type movable object within a frame of the computer input device of FIG. 1.

Referring to FIG. 2a, connected to one end of each spring 30 is a detector 40 for detecting a direction in which the spring 30 is pulling on the detector 40. An object on a screen of the computer 26 can thus be manipulated in three dimensions by the inventive computer input ball assembly 100. Moving a 3-dimensional cursor (object) on the screen of computer 26 using the assembly 100 requires nothing more than pushing or pulling the ball 10 in the desired direction of movement.

Figure 3B:
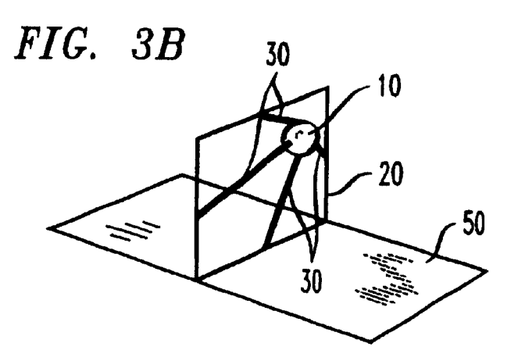
Figure 3C:
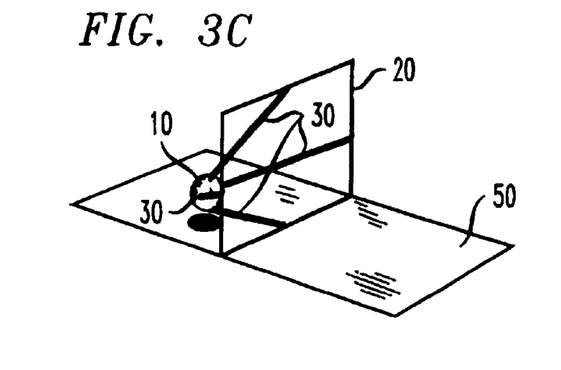
Figure 3D:
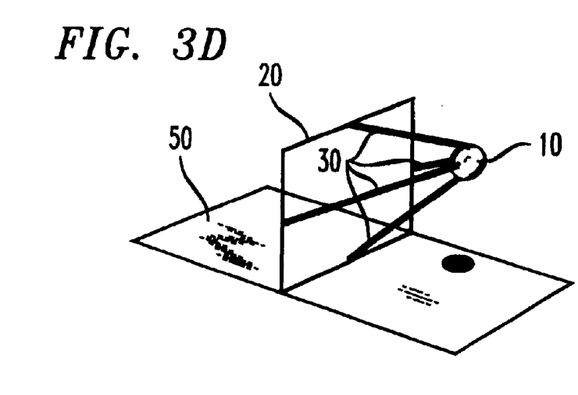

FIGS. 3a–d depict various exemplary positions of ball 10 relative to frame 20 and a base 50 on which the frame 20 is mounted. FIG. 3a shows the rest position of ball 10 which results in no movement of the cursor. FIG. 3b shows the translated position of ball 10 for moving the cursor upward and toward the right. FIG. 3c shows the translated position of ball 10 for moving the cursor forward, downward, and to the left. Finally, FIG. 3d shows the translated position of ball 10 for moving a cursor backward, upward, and to the right.

Figure 4A:
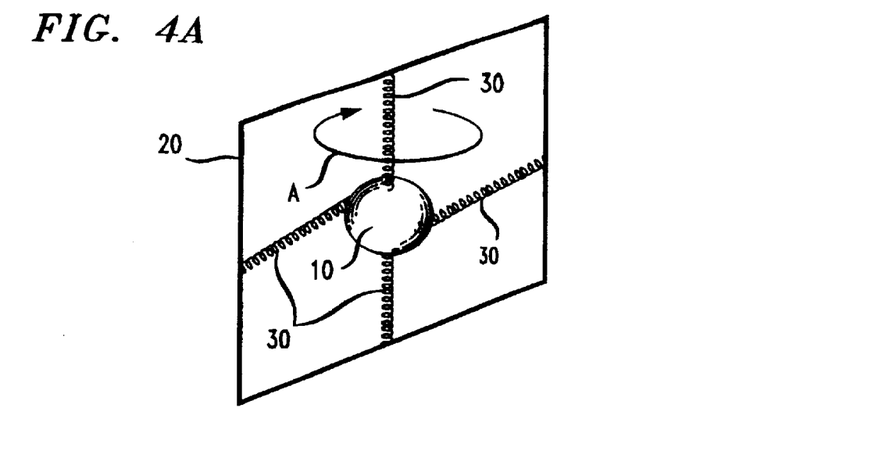
FIGS. 4a and 4b are diagrammatic perspective views of the computer input device of FIG. 1 showing various rotational motions of the movable ball relative to the frame.
Figure 4B:
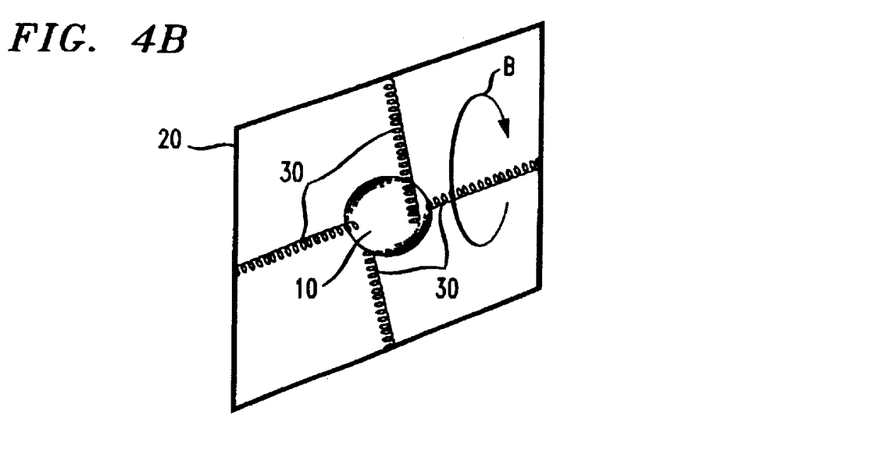

The cursor of computer 26 can also be rotated about each of the three coordinate axes through operative manipulation of the ball 10. FIG. 4a shows the position of ball 10 with respect to frame 20 for rotating the cursor about a vertical axis in the direction indicated by arrow A. FIG. 4b illustrates the position of ball 10 with respect to frame 20 for rotating the cursor about a horizontal axis parallel to the plane of frame 20 in the direction indicated by arrow B.

Detectors 40 may be any type of detector that outputs a signal representing a two-dimensional direction in which the associated spring 30 connected thereto is pulling relative to a plane that lies perpendicular to the normal or rest position of the spring 30. The output of each of the detectors 40 is transmitted to the processor 25 that resides in either the computer input ball assembly 100 or the computer 26 to which it is connected, or in a separate housing or location therebetween.

Figure 5:
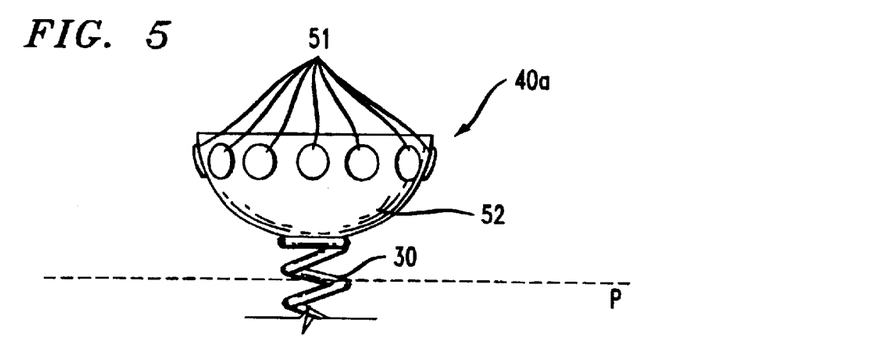
FIG. 5 shows a pressure sensor type two-dimensional position detector.

A suitable pressure sensor detector 40a for use in accordance with the present invention is shown in FIG. 5. The detector 40a comprises a movable portion 52 connected to the spring 30 with an array of pressure sensors 51 mounted around its circumference and fixedly connected to either the ball 10 or the frame 20. The connection of the sensors to the frame or ball is not shown in FIG. 5. Pressure sensors 51 may be commercially available Entran model EPL-B0 surface mount pressure sensors, which may be purchased from Entron Devices, Inc., Fairfield N.J., or any other surface mountable thin profile pressure sensor device.

Figure 6A:
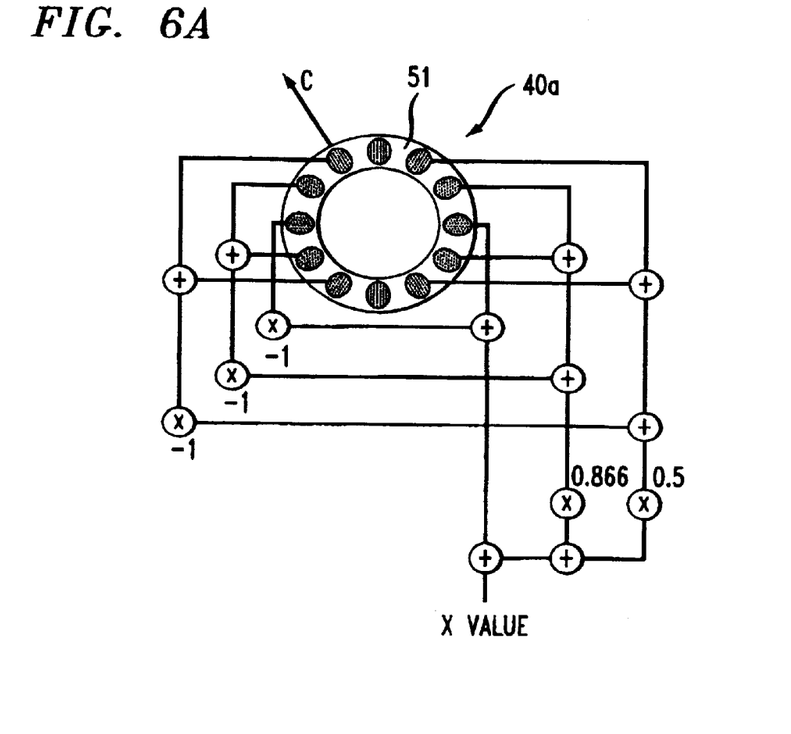
FIGS. 6a and 6b are schematic diagrams of the pressure sensor type two-dimensional position detector which depict the manner in which the two-dimensional position of the movable ball is determined.
Figure 6B:
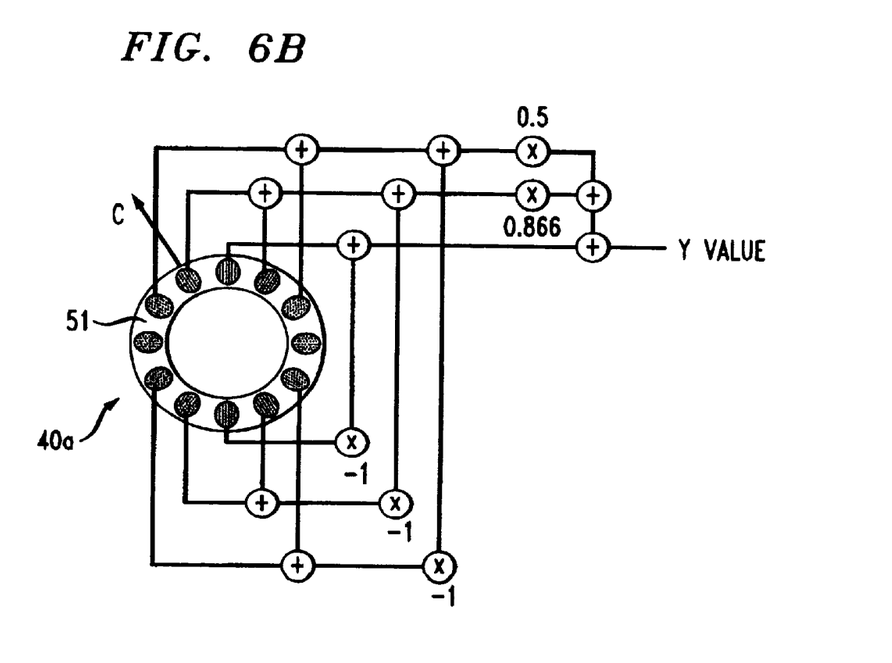

The normal or rest position of the spring 30 is depicted in FIG. 5. When ball 10 is selectively moved, the detector 40 detects movement in a plane P that lies perpendicular to the extension of spring 30 in the rest position. FIGS. 6a and 6b depict the manner in which the sensors 51 of detector 40a are used to determine an X coordinate and a Y coordinate. For example, and referring to FIGS. 6a and 6b, if the extension of spring 30 in the rest position was into the plane of the drawings, and the spring were pulled or extended in the direction of arrow C, then detector 40a would output a −0.5 X value and a +0.866 Y value. As mentioned above, the positions of all of the detectors 40 are transmitted to the processor 25 to operatively determine the translated position of the ball 10.

In the particular embodiment of detector 40a shown in FIG. 5, the movable portion 52 is a semisphere and twelve pressure sensors 51 surround the movable portion 52. However, movable portion 52 may alternately comprise another shape and any lesser or greater number of pressure sensors may be employed to provide the desired accuracy.

Figure 7:
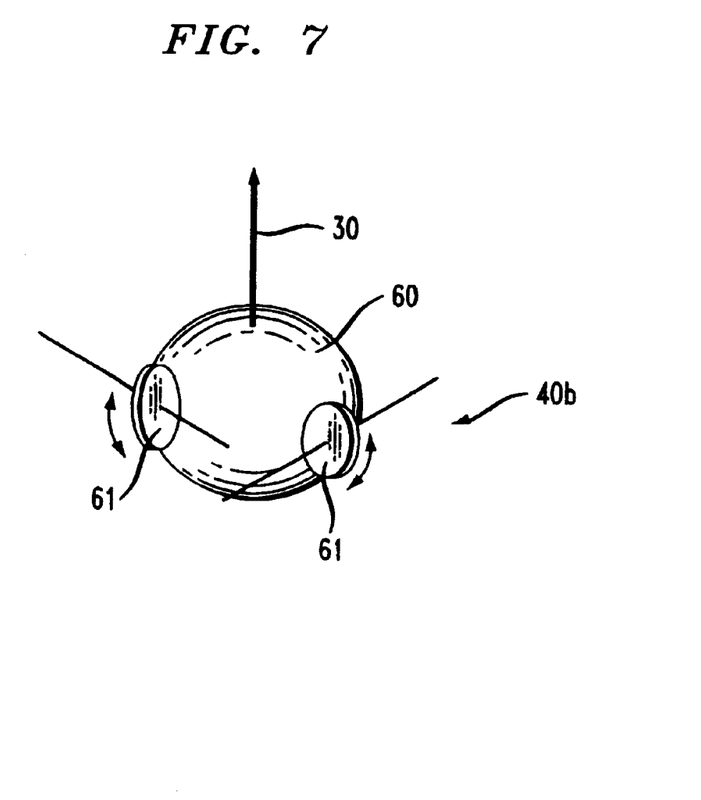
FIG. 7 shows a mouse type two-dimensional position detector.

Another form of detector suitable for use in accordance with the invention that is the mouse-type detector 40b shown in FIG. 7. In this embodiment, the schematically-depicted spring 30 is connected to a rotatable ball 60. When spring 30 is pulled or moved from its rest position, a pair of rollers 61 disposed in contact with the ball 60 rotatably move or roll about the ball surface. Encoders (not shown) connected to the rollers 61 transmit signals to a processor to determine the position of the ball 10 relative to a plane which intersects the two axes of the rollers 61. The rollers 61 may alternately be eliminated by instead employing encoders operable to directly detect the two directional components of movement of the ball 60.

Figure 8:
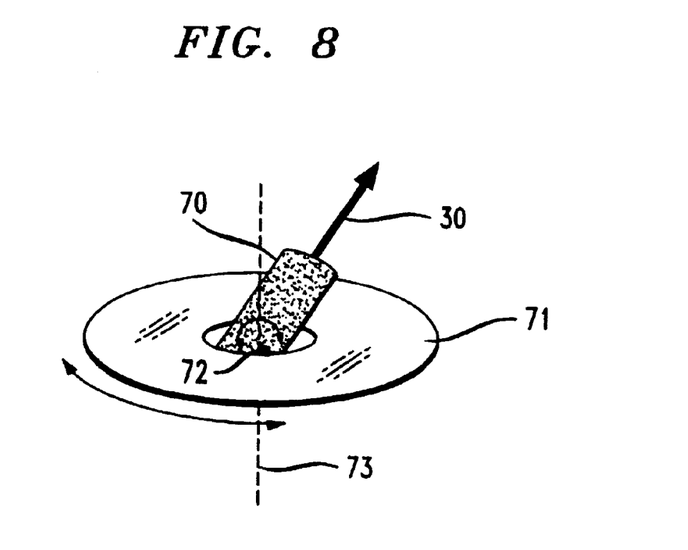
FIG. 8 shows a gimbal type two-dimensional position detector.

Still another type of detector which may be used in accordance with the invention is a gimbals detector 40c schematically depicted in FIG. 8. The gimbals detector 40c determines the current position of the associated spring 30 by measuring the angular displacement of a first part 70 from its normal orientation along a first axis 72, relative to a second part 71 from its normal orientation with respect to a second axis 73. Each gimbals detector 40c may be used to operatively calculate a three-dimensional vector.

Figure 9:
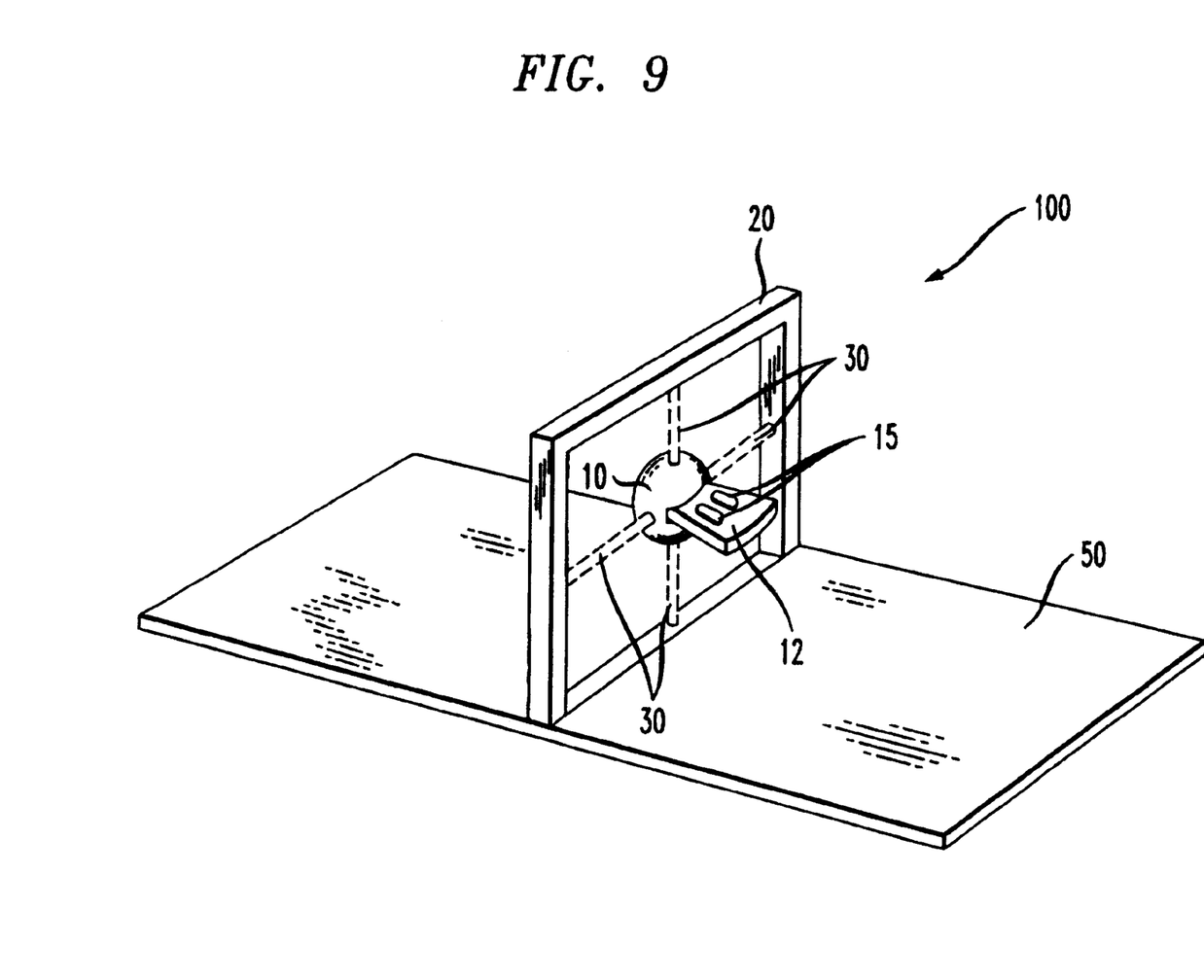
FIG. 9 is a perspective view of another embodiment of the inventive computer input device with a handle portion extending from the movable object.

Referring now to FIG. 9, a further embodiment of the inventive assembly 100 has a ball 10 that includes a depending handle portion 12 graspable by a user to selectively move the ball 10. The actuatable input buttons 15 are optionally positioned on the handle portion 12 to facilitate their operation by the user. Although handle portion 12 is shown in FIG. 9 as a substantially flat element projecting horizontally outward from the ball 10, the handle 12 may alternately have any shape or form deemed ergonomically advantageous. Similarly, the location of the input button 15 on the handle portion 12 may be moved to any location that may facilitate its operation by a user. For example, the handle portion 12 shown in FIG. 9 may be reoriented or rotated by 90° so that the input buttons 15 are located on a side of the handle portion 12. Handle portion 12 may alternately be in the form of a pistol grip with the input buttons 15 mounted atop the grip for ease of operation by the thumb, or the buttons 15 may be located in the position of a trigger of a conventional pistol.

Instead of a ball 10, any other shaped object graspable or otherwise manipulatable by a user may be connected to the frame 20 by the springs 30.

In addition, although the frame 20 is shown as being a closed rectangle, it may alternately take on a variety of other shapes or configurations. For example, the frame 20 may comprise two substantially parallel posts which are supported on the base 50. In this case, the four elastic springs 30 may respectively extend between the top or bottom of the posts of frame 20 and the ball 10 so that the springs appear to form an X and thereby maintain the ball 10 at its rest position with respect to the frame 20. Furthermore, instead of a vertically mounted frame 20 the ball 10 may be suspended from a horizontal type frame such, for example, as a square or rectangular or U-shaped frame lying along a generally horizontal plane. The frame may alternately be formed of a combination of vertical and horizontal support components or elements mounted or extending in any other directions so long as sufficient user access is provided to the ball 10.

Instead of being located on the ball 10, the input button 15 may also be located elsewhere on the computer input ball assembly 100, e.g., on the frame or at an edge or other portion of the base 50, or even mounted on one or more of the springs 30. In a still further modification, a plurality of buttons 15 may be located at two or more separated locations, such as one button 15 being carried on the ball 10 and another button 15 positioned on the frame 20 or base 50.

It is also contemplated that the computer input ball assembly 100 may have one or more duplicate sets of buttons located at different locations; for example, one button 15 may be located on ball 10 with a duplicate button having the same functionality located on the base 50. With the latter embodiment, when not manipulating the ball 10 the user can easily operate the button 15 on base 50 to provide the desired activation functionality without having to touch the ball 10 and possibly unintendedly disturb the position of the cursor on the display screen of the computer 26.

Figure 2B:
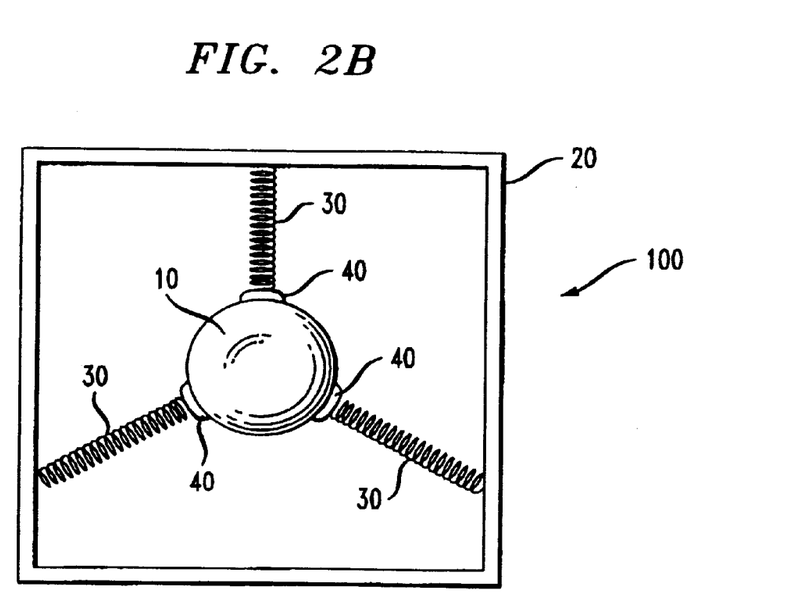

Although FIG. 2a shows four springs 30 used to connect the ball 10 to the frame 20, three springs 30 may instead be utilized as, for example, shown in FIG. 2b, or, indeed, more than four springs may be used. FIGS. 2a and 2b also depict how the detectors 40 can be mounted at the ball 10 or at the frame 20. As will be appreciated, at least three detectors are required to supply the six dimensional signals contemplated for use in accordance with the invention. However, if only three-coordinate signals are required, without determination of rotational movement, then two detectors having at least one different axis of detection may be employed. For example, one of the top and bottom detectors and one of the side detectors in FIG. 2a may be used for this purpose.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform, substantially the same function in substantially the same way to achieve the same results are within the scope of the invention. It is the intention, therefore, to be limited only as indicated by the scope of the claims appended hereto.

I claim:

1. A computer input device for providing three-dimensional position signals for use by a computer in accordance with external forces selectively applied to the input device by a user, comprising:
   a support;
   first, second and third elongated elastic members each having a first end and a second end, said first ends being connected to said support at spaced apart positions along the support;
   an object connected to the second ends of said first, second and third elastic members so that said elastic members elastically support the object for movement of the object, relative to the support, between a stable rest position absent an application of external forces to said movable object, and a second position at least one of translated and rotated from said rest position in response to applied external forces, and so that said object is returned from said second to said rest position under a return urgency of said elastic members upon removal of the applied external forces, each said elastic member defining in said rest position of the movable object an axis extending along the elongation of said each elastic member; and
   first, second and third detectors each respectively connected to one of said first, second and third elastic members for detecting changes in orientation of the axis of the respective elastic element connected thereto and for operatively outputting a signal related to a detected change in the orientation of said axis of the respective elastic member connected thereto, so that said outputs of the first, second and third detectors collectively indicate the three-dimensional position of said movable object relative to said support, wherein said support peripherally surrounds said object in the rest position of said object and thereby defines a visual reference plane having mutually opposed open sides through which said object is viewable whereby the three-dimensional position of said movable object is visually determinable with reference to said support.

2. The computer input device of claim 1, wherein at least one of said first, second, and third detectors comprises a pressure sensor.

3. The computer input device of claim 2, wherein said pressure sensor comprises a connecting piece connected to said respective elastic member at a connecting position on said connecting piece and a plurality of pressure detectors surrounding said connecting position of said connecting piece for detecting changes in orientation of the axis of the respective elastic member.

4. The computer input device of claim 3, wherein said connecting piece comprises a semisphere.

5. The computer input device of claim 4, wherein said pressure sensor comprises twelve pressure detectors evenly spaced about said connecting position.

6. The computer input device of claim 1, wherein at least one of said first, second, and third detectors comprises a detector having a ball and socket joint connected to said respective elastic member and detectors for detecting movement of the ball in two dimensions in response to changes in the orientation of said respective elastic member.

7. The computer input device of claim 1, wherein at least one of said first, second, and third detectors comprises a gimbal.

8. The computer input device of claim 1, further comprising an input button for providing an input signal to the computer.

9. The computer input device of claim 8, wherein said input button is mounted on said movable object.

10. The computer input device of claim 9, wherein said first, second, and third detectors are respectively operatively connected to said second ends of said first, second, and third elastic members.

11. The computer input device of claim 8, wherein said input button is mounted on said computer input device remote from said movable object.

12. The computer input device of claim 1, wherein said first, second, and third detectors are respectively operatively connected to said second ends of said first, second, and third elastic members.

13. The computer input device of claim 1, wherein said first ends of said first, second, and third elongated elastic members are positioned within a plane.

14. The computer input device of claim 1, wherein said movable object comprises a handle for facilitating the digital positioning of said movable object with respect to said support by a user.

15. The computer input device of claim 14, further comprising an input button mounted on said handle portion for providing an input signal to said computer.

16. The computer input device of claim 1, further comprising a wireless transmitter for transmitting said electrical signals of said first, second, and third detectors to the computer.

17. The computer input device of claim 1, wherein at least one of said elastic elements comprises a spring.

18. The computer input device of claim 1, wherein at least one of said elastic elements comprises an elastic band.

19. The computer input device of claim 1, further comprising a fourth elongated elastic member having a first end connected to said support and a second end connected to said object.

20. The computer input device of claim 19, further comprising a fourth detector connected to said fourth elastic member for detecting changes in the orientation of the axis of the fourth elastic element and outputting a signal related to a detected change in the orientation of said axis of said fourth elastic member, such that said outputs of the first, second, third, and fourth detectors collectively indicate the three-dimensional position of said object relative to said support.

21. A computer input device for providing three-dimensional position signals for use by a computer in accordance with external forces selectively applied to the input device by a user, comprising:
   a support;
   an object;
   first, second and third means for elastically supporting said object for movement of said object, relative to said support, between a stable rest position absent application of external forces to said object, and a second position at least one of translated and rotated from said rest position in response to an application of external force; and
   means for detecting two dimensions of movement of each of said first, second and third means for supporting when said object is moved from said rest position to said second position for determining said second position, wherein said support peripherally surrounds said object in the rest position and thereby defines a visual reference plane having mutually opposed open sides through which said object is viewable whereby the three-dimensional position of said movable object is visually determinable with reference to said support.

22. The computer input device of claim 21, wherein said means for detecting further comprises means for generating an output signal related to said detected change in the position of said object.

23. The computer input device of claim 21, further comprising button means for providing an input signal to the computer.

24. The computer input device of claim 23, wherein said button means for providing an input signal is mounted on said object.

25. The computer input device of claim 23, wherein said button means for providing an input signal is mounted on said computer input device remote from said object.

26. The computer input device of claim 21, wherein said connections of each said first, second and third means for supporting said object are positioned within a plane.

27. The computer input device of claim 21, wherein said means for detecting comprises a pressure sensor.

28. The computer input device of claim 27, wherein said pressure sensor comprises a connecting piece connected to a respective one of said first, second, and third means for supporting at a connecting position on said connecting piece and a plurality of pressure detectors surrounding said connecting position of said connecting piece for detecting changes in orientation of the axis of the respective one of the first, second, and third means for supporting.

29. The computer input device of claim 28, wherein said connecting piece comprises a semisphere.

30. The computer input device of claim 29, wherein said pressure sensor comprises twelve pressure detectors evenly spaced about said connecting position.

31. The computer input device of claim 21, wherein said means for detecting comprises a detector having a ball and socket joint connected to a respective one of said first, second, and third means for supporting and detectors for detecting movement of the ball in two dimensions in response to changes in the orientation of the respective one of said first, second, and third means for supporting.

32. The computer input device of claim 21, wherein said means for detecting comprises a gimbal.

33. A computer input device for providing three-dimensional position signals for use by a computer in accordance with external forces selectively applied to the input device by a user, comprising:
   user manipulatable object means for receiving an external force to indicate motion in an at least three-dimensional space;
   at least three means for supporting said object means at a stable rest location from which said object means may be displaced in said at least three-dimensional space in response to the external force and for providing a return urgency to return said object means to said rest location upon removal of the external force; and
   sensing means for detecting motion in a two-dimensional space of three of said at least three means for supporting, whereby motion of said object means in three-dimensional space is measured, wherein said at least three means for supporting said object are arranged on a support peripherally surrounding said object in the rest position and defining a visual reference plane having mutually opposed open sides through which said object is viewable whereby the three-dimensional position of said movable object is visually determinable with reference to said support.

34. A method for providing a three-dimensional computer signal for use by a computer, comprising the steps of:
   receiving an external force for moving an elastically supported object from a rest position to a second position;
   detecting, by at least three detectors, two-dimensional directions of the movement of the object from the rest position to the second position relative to planes associated with each of the at least three detectors;
   generating a signal related to the direction of the movement of the object in an at least three-dimensional space from the rest position to the second position from said three two-dimensional directions detected by the three detectors; and
   visually determining the three-dimensional position of the object with reference to a support which peripherally surrounds the object in the rest position and thereby defines a visual reference plane having mutually opposed open sides through which the object is viewable.

35. The method of claim 34, wherein said step of detecting comprises detecting a movement of an elastic support of the object for determining the second position of the object.

36. The method of claim 34, wherein said step of detecting comprises detecting a change in orientation of a longitudinal axis of an elastic support for the object for determining the second position of the object.

\* \* \* \* \*